Aug. 11, 1936.  H. T. FAUS  2,050,881
LAG PLATE FOR WATT-HOUR METERS
Filed Nov. 30, 1935  2 Sheets-Sheet 1

Magnetic Material
Negative Temperature
Coefficient of Permeability.

Negative Temperature
Coefficient of Permeability.

Inventor:
Harold T. Faus,
by Harry E. Dunham
His Attorney.

Aug. 11, 1936.  H. T. FAUS  2,050,881

LAG PLATE FOR WATT-HOUR METERS

Filed Nov. 30, 1935  2 Sheets-Sheet 2

Inventor:
Harold T. Faus,
by Harry E. Dunham
His Attorney.

Patented Aug. 11, 1936

2,050,881

UNITED STATES PATENT OFFICE 2,050,881

LAG PLATE FOR WATT-HOUR METERS

Harold T. Faus, Lynn, Mass., assignor to General Electric Company, a corporation of New York Application November 30, 1935, Serial No. 52,382

14 Claims. (Cl. 171—264)

My invention relates to temperature compensation of electrical devices and circuits, such as meters, relays, measuring circuits and the like. The invention is particularly useful in connection with alternating-current watt-hour meters for compensating such meters for a class of temperature errors which are pronounced at low power factors.

It is an object of my invention to provide a compensating unit which may be inductively related to an electrical circuit or to an electromagnet for compensating temperature variation in both magnitude and phase of the magnetic flux or of the exciting current.

It is a further object of my invention to provide a unitary movable temperature compensated lag plate or a light-load plate for an alternating-current watt-hour meter.

It is likewise an object to provide a compensated lag plate which is not only highly durable, sturdy, and substantially indestructible, but which is also relatively easily manufactured, installed, and adjusted.

Other and further objects and advantages will become apparent as the description proceeds.

Figure 5:
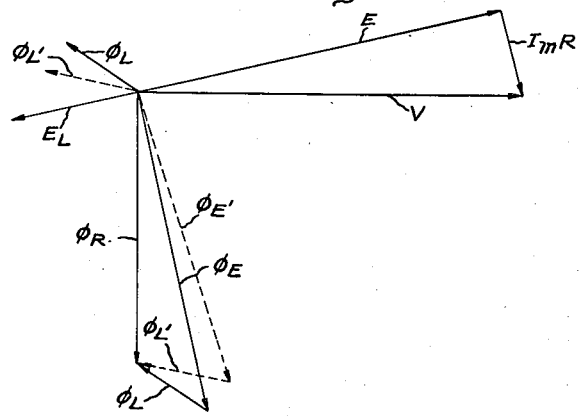
Figure 6:
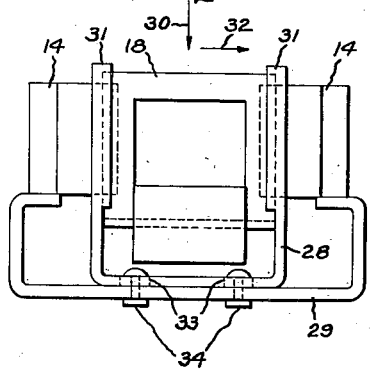

In carrying out the invention in its preferred form I employ the general compensating principle of the apparatus disclosed in Fig. 5 and explained in Figs. 6 and 7 of United States Patent No. 1,761,764 to Witherow. However, I use a relatively rigid lag plate including a temperature-responsive variable inductance integral with the lag plate, and I utilize an electrically-conducting core carrying what might be called a single-turn magnetic coil instead of winding a thin breakable conductor on a magnetic core.

Figure 1:
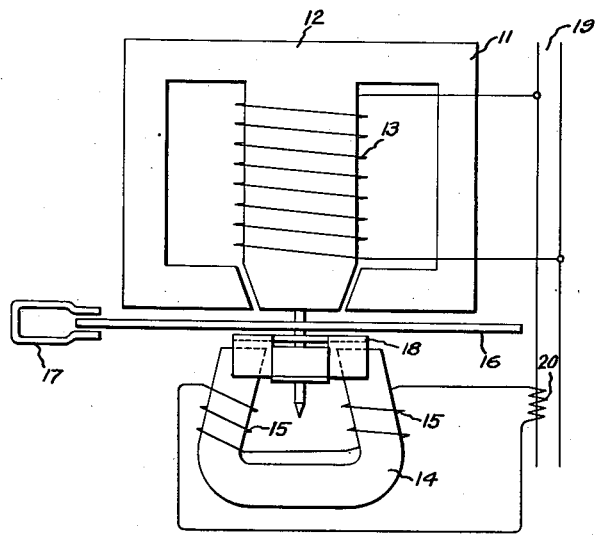
Figure 2:
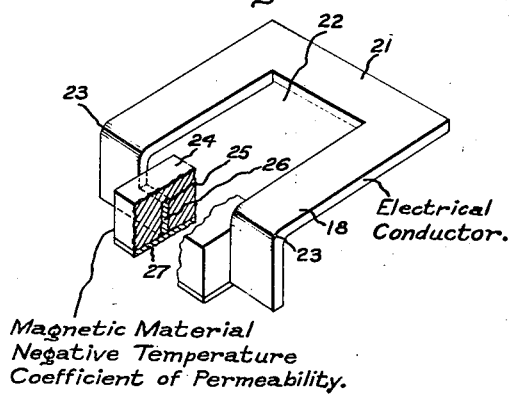
Figure 3:
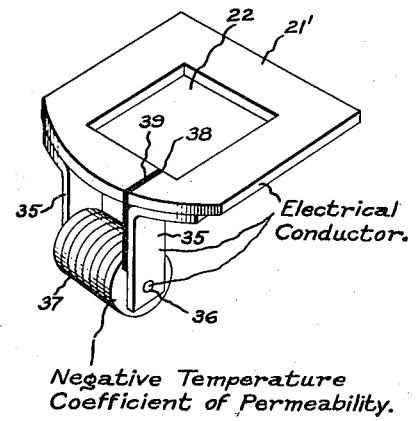
Figure 4:
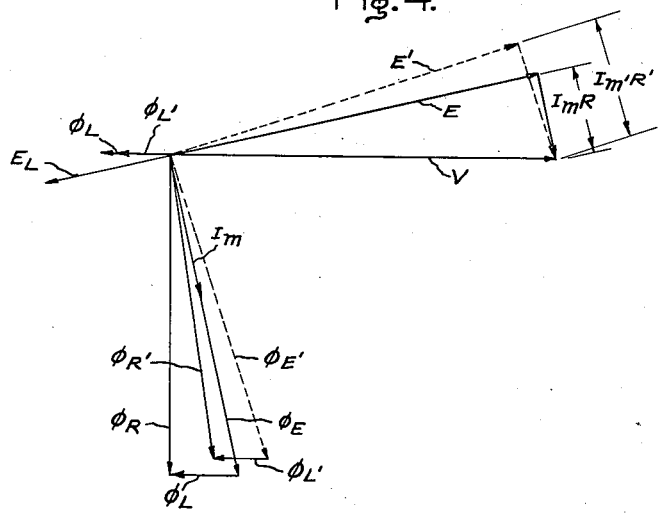

My invention will be understood more readily from the following detailed description when considered in connection with the accompanying drawings and those features of my invention which are believed to be novel and patentable will be pointed out in the claims appended hereto. In the drawings, Fig. 1 is a schematic diagram of a watt-hour meter incorporating one embodiment of my invention; Fig. 2 is a perspective view, with a portion broken away, of the lag plate shown in the apparatus of Fig. 1; Fig. 3 is a perspective view of a modified lag plate; Figs. 4 and 5 are vector diagrams explanatory of the potential flux lagging of a watt-hour meter before and after compensation, respectively; and Fig. 6 is a plan view of a mounting arrangement for a lag plate.

The watt-hour meter 11 represented in Fig. 1 of the drawings comprises a potential core 12 carrying a potential winding 13, a current core 14 carrying a current winding 15, a rotatable disk 16, a drag magnet 17, and a lag plate 18. The potential winding 13 is connected across an electrical circuit 19 in which power consumption is to be measured, and the current winding 15 is connected in series with the circuit 19 or through a current transformer 20.

The lag plate 18 comprises a rectangular sheet of conducting material 21 with a rectangular central portion 22 cut out to form a figure resembling a hollow square. The sheet 21 is bent down at right angles near one end, along the line 23—23. A block 24 of magnetic material having a negative temperature coefficient of permeability is provided with a longitudinal groove 25 fitting the side 26 of the hollow square formed by the sheet 21. The block 24 is slipped on to the side 26 and, in order to minimize the reluctance of the magnetic circuit around the side 26 provided by the block 24, a plate 27 of magnetic material is laid against the lower face of the block 24 covering the groove 25. The block 24 and the plate 27 may be held together in any suitable manner, for example, by spot welding.

Preferably, the lag plate 18 is movably mounted, and it may be mounted to permit adjustment in either of two perpendicular directions in a plane parallel to the disk 16. For example, I may provide a sling 28 (Fig. 6), adjustably supported on a bracket 29, secured to the field 14 or other supporting structure (not shown). The position of the lag plate 18 may be adjusted in a direction parallel to the arrow 30 by sliding in supporting grooves 31 of the sling 28. The position of the lag plate 18 may be adjusted in the direction of the arrow 32 by sliding the sling 28 along the bracket 29, the holes 33 co-operating with the rivets 34 being elongated. If desired, adjustment perpendicular to the disk 16 (Fig. 1) may also be provided.

The principle of the induction watt-hour meter is well known and need not be explained further than to say that potential and current fluxes, displaced in time phase, produced by the potential and current windings 13 and 15, respectively, react upon the induction disk 16 to cause rotation thereof. At unity power factor, the fluxes should be exactly in quadrature and, at other power factors, the potential flux should continue in quadrature with the potential while the current flux remains in phase with load current. At unity power factor, slight deviations in phase relationship of the fluxes from the correct condition are relatively unimportant. However, at lower power factors, when there is a substantial phase displacement between the voltage and load current in the circuit 19, deviation from the proper phase relationship of the fluxes will materially impair the accuracy of the meter. Such deviations tend to occur in an uncompensated meter owing to temperature variation, as will presently be explained.

The flux produced by the current winding of a watt-hour meter is in phase with the load current of the circuit since the current winding carries the load current or a corresponding current. The magnetizing current of the potential winding and the flux produced thereby are nearly in quadrature with the voltage of the circuit, owing to the inductance of the potential winding, and a lag coil is customarily employed to bring about exact quadrature relationship at the average temperature of the meter.

In the vector diagram, Fig. 4, the vector V represents the voltage of the circuit 19, the vector $I_mR$ represents the resistance drop in the winding 13 due to the magnetizing current $I_m$, and the vector E represents the reactance drop corresponding to the voltage induced by the magnetizing current $I_m$. The vector $\phi_E$ represents the potential flux of the meter produced by the magnetizing current $I_m$ and is in quadrature with E. The line voltage V and the flux $\phi_E$ are not exactly in quadrature. However, the discrepancy may be corrected at any given temperature by means of a lag plate of conventional design. Such a lag plate acts as a transformer secondary inducing a voltage $E_L$. A conventional lag plate, consisting almost entirely of resistance, carries a current nearly in phase with the induced voltage $E_L$, which produces a flux $\phi_L$ nearly in phase with the voltage $E_L$. The flux $\phi_L$ combined vectorially with the flux $\phi_E$ produces a resultant flux $\phi_R$ in exact quadrature with the line voltage V. In case of a rise in temperature, the resistances of the winding 13 and of the lag coil also rise. Consequently, there is a greater resistance drop $I_m'R'$, causing a greater vectorial difference between the line voltage V and the induced voltage E'. As a result, the potential flux is diminished in value and advanced in phase as shown by the vector $\phi_E'$. At the same time, the flux produced by the lag plate is diminished in value with substantially no change in phase and a new value $\phi_L'$ results. The new resultant $\phi_R'$ is no longer in quadrature with the line voltage V and is also diminished somewhat in value.

Fig. 5 explains the compensation accomplished by means of my improved lag plate 18. As before, the flux $\phi_L$ produced by the lag plate 18 corrects the flux $\phi_E$ to produce a resultant flux $\phi_R$ in quadrature with V. However, owing to the reactance of the lag plate, there is a substantial phase lag between $\phi_L$ and $E_L$. Upon a rise in temperature, the flux $\phi_E'$ is again out of quadrature with the line voltage V. Owing to decrease in permeability, reluctance, and reactance of the lag plate with increase in temperature, the flux produced by the lag plate increases in scalar value and decreases in lag beind $E_L$ to the new value, $\phi_L'$. The resultant of $\phi_E'$ and $\phi_L'$ is, therefore, substantially the same as before and $\phi_R$ remains substantially independent of temperature.

Owing to the unitary construction and indestructibility of the lag plate 18, there is no danger of any connections becoming open-circuited, or of the compensation varying, so that the central station operator is assured at all times that his meters are lagged and that the lagging is correctly compensated for variations in temperature.

Suitable dimensions and compositions of the sheet 21, the block 24, and the plate 27 will readily suggest themselves to those skilled in the art and it will be understood that I am not limited to any precise values. However, I have obtained satisfactory results in a watt-hour meter of standard design intended for 60-cycle circuits by employing a lag plate constructed as follows:

The sheet 21 was cut from .060 inch copper stock to form a rectangle approximately one and five-eighths by one and one-eighth inches with a rectangular opening approximately one and one-eighth by one-half inches, and the side 26 of the hollow square was made approximately one-eighth inch in width. The block 24 was composed of 29.5 per cent nickel steel. It was made approximately one-half inch long, five-sixteenths of an inch wide (measured perpendicular to the portion 26 of the sheet 21) and .166 inch thick, with a groove one-sixteenth of an inch wide by one-eighth of an inch deep. The magnetic plate 27 was cut from a .030 inch sheet of iron of a type known by the trade name "Armco iron". It will be understood that adjustments in the resistivity or reluctance at a predetermined normal temperature may be effected by filing away or drilling out a portion of the material and filling in again if too much is removed.

In some watt-hour meters, the lag plate is employed also as a light-load plate operating as a shading coil to produce a torque overcoming static friction of the bearings supporting the disk 16. My lag plate lends itself well to such use also since the reactance is integral with its plate and there are no connections or leads to interfere with moving the plate 18 for adjustment, or to be broken during adjustment. The degree of lagging may be adjusted by moving the plate 18 in the direction of the arrow 30 (Fig. 6), and the amount of light-load torque may be adjusted by moving the plate 18 in the direction of the arrow 32. My lag plate 18 may, of course, also be used in conjunction with a conventional lag plate or a conventional light-load plate or both to increase the ease and flexibility of adjusting the amount of lagging, the amount of light-load torque, and the amount of compensation of either or both for variations in temperature.

In Fig. 3, I have disclosed a modified construction for the compensated lag plate. A sheet 21' formed to resemble a hollow square may have one side cut in the middle and bent down to form a U with two laterally projecting angle portions 35 or, as shown in Fig. 3, separate angles 35 may be attached to the sheet 21' in some suitable manner as by soldering or welding. A rod 36 of conducting material, electrically connecting the ends of the projections 35, has annuli or pierced disks 37 or a hollow cylinder surrounding it. The annuli 37 are composed of a magnetic material decreasing in permeability with rise in temperature. Fig. 3 illustrates a manner of compensating a lag plate of standard design by adding the parts 35, 36, and 37. The sheet 21' may be such a standard lag plate of leaded bronze which has, however, been sawed through at 38 to cause the electrical circuit to thread the variable reluctance annuli 37. An insulating piece 39 may be inserted in the slot 38 to guard against short-circuiting the reactance formed by the rod 36 and the annuli 37. Any suitable material may be employed for the annuli 37, for example, an alloy of approximately 68 per cent nickel, 30 per cent copper, and 2 per cent iron, such as described in United States Patent No. 1,706,172 to Kinnard.

I have herein shown and particularly described certain embodiments of my invention and certain methods of operation embraced therein for the purpose of explaining its principle and showing its application but it will be obvious to those skilled in the art that many modifications and variations are possible and I aim, therefore, to cover all such modifications and variations as fall within the scope of my invention which is defined in the appended claims.

What I claim as new and desire to secure by Letters Patent of the United States, is:

1. A lag plate for an alternating-current watt-hour meter comprising in combination, a sheet of electrically-conducting material with a center portion removed to form a figure resembling a hollow square providing a closed electrical circuit, a magnetic block, and a magnetic plate, said block having a longitudinal groove fitting one side of said hollow square, said side of said hollow square being fitted into said groove, said magnetic plate being laid against one side of said block to cover said groove and substantially to close a magnetic circuit around said side of said hollow square, one of said magnetic members including a material having a negative temperature coefficient of permeability.

2. A lag plate for an alternating-current watt-hour meter comprising in combination, a sheet of electrically-conducting material with a center portion removed to form a plane figure resembling a hollow rectangle providing a closed electrical circuit, said sheet being bent down at a right angle near one end to bring one side of said figure below and perpendicular to the remainder thereof, and a magnetic block with a longitudinal groove fitting said lowered side of said hollow rectangle, said lowered side being fitted into said groove, said block including a material having a negative temperature coefficient of permeability.

3. A lag plate for an alternating-current watt-hour meter comprising in combination, a sheet of electrically-conducting material with a center portion removed to form a figure resembling a hollow square providing a closed electrical circuit, and a magnetic block with a longitudinal groove fitting one side of said hollow square, said side of said hollow square being fitted into said groove, said block including a material having a negative temperature coefficient of permeability.

4. A lag plate for an alternating-current watt-hour meter comprising in combination, a magnetic circuit member and a closed-electric-circuit member comprising a sheet of electrically-conducting material with a central portion removed to form a U, angle portions at the ends of said U being bent downward to form a pair of parallel lateral projections, and a rod of electrically-conducting material electrically connecting the end portions of said projections, said magnetic circuit member comprising a plurality of annuli surrounding said rod and comprising a material having a negative temperature coefficient of permeability.

5. A lag plate for an alternating-current watt-hour meter comprising in combination, a magnetic circuit member and a closed-electric-circuit member comprising a sheet of electrically-conducting material with a central portion removed to form a U, angle portions at the ends of said U being bent downward to form a pair of parallel lateral projections, and a rod of electrically-conducting material electrically connecting the end portions of said projections, said magnetic circuit member comprising a hollow cylinder surrounding said rod and comprising a material having a negative temperature coefficient of permeability.

6. A lag plate for an alternating-current watt-hour meter comprising in combination, a closed-electric-circuit member comprising a sheet of electrically-conducting material with a center portion cut out to form a figure resembling a hollow square, and a magnetic circuit member, said electric-circuit member having one side bent out of the plane of said hollow square and carrying said magnetic circuit member, said magnetic member substantially surrounding a portion of said side of said electric-circuit member and including material having a negative temperature coefficient of permeability.

7. A lag plate for an alternating-current watt-hour meter comprising in combination, a closed-electrical-circuit member comprising a sheet of electrically-conducting material with a center portion cut out to form a figure resembling a hollow square, and a magnetic circuit member carried by said electrical-circuit member and substantially surrounding a portion of said electrical-circuit member, said magnetic member including material having a negative temperature coefficient of permeability.

8. A lag plate for an alternating-current watt-hour meter comprising in combination, an electric-circuit member comprising relatively rigid electrically-conducting material formed as a closed loop, and a magnetic circuit member carried by said electric-circuit member and substantially surrounding a portion thereof, said magnetic member including material having a negative temperature coefficient of permeability.

9. A lag plate for an alternating-current watt-hour meter comprising in combination, a closed-electrical-circuit member comprising a sheet of electrically-conducting material with a center portion cut out to form a figure resembling a hollow square, and a magnetic circuit member linking said electrical-circuit member and including material having a negative temperature coefficient of magnetic permeability.

10. A lag plate for an alternating-current watt-hour meter comprising in combination a closed-electric-circuit member comprising a sheet of electrically-conducting material with a center portion cut out to form a figure resembling a hollow square, and a magnetic circuit member linking said electric-circuit member and including a material having a magnetic permeability varying with temperature.

11. A lag plate for an alternating-current watt-hour meter comprising in combination, an electric-circuit member comprising relatively rigid electrically-conducting material formed as a closed loop, and a magnetic circuit member carried by said electric-circuit member and substantially surrounding a portion thereof, said magnetic member including a material having a magnetic permeability varying with temperature.

12. In a lag plate for an alternating-current watt-hour meter, a negative temperature coefficient compensating reactor integral with a closed loop of electrically-conducting material.

13. An induction device having current and voltage electromagnets, a disk of conducting material rotatably mounted between said electromagnets and acted upon by the fluxes of said electromagnets, and a lag plate between said electromagnets and adjustable with respect thereto for obtaining a desired phase relation between the fluxes produced by the different electromagnets, said lag plate comprising a unitary structure consisting of a closed loop of electrically conducting material with a negative temperature coefficient compensating reactor integral therewith.

14. An induction device having current and voltage electromagnets, a disk of conducting material rotatably mounted between said electromagnets and acted upon by the fluxes of said electromagnets, and a lag plate between said electromagnets and adjustable with respect thereto for obtaining a desired phase relation between the fluxes produced by the different electromagnets, said lag plate comprising a unitary structure including, in combination, an electric-circuit member comprising relatively rigid electrically-conducting material formed as a closed loop, and a magnetic circuit member carried by said electric-circuit member and substantially surrounding a portion thereof, said magnetic member including a material having a magnetic permeability varying with temperature.

HAROLD T. FAUS.